United States Patent [19]

Jung et al.

[11] Patent Number: 4,873,011

[45] Date of Patent: Oct. 10, 1989

[54] ANTIFREEZE CORROSION INHIBITOR COMPOSITION FOR ALUMINUM ENGINES AND RADIATORS

[75] Inventors: Il Nam Jung; Sang Yo Hwang, both of Seoul; Chung Suk Lee, Busan, all of Rep. of Korea

[73] Assignee: Korea Advanced Institute of Science and Technology, Rep. of Korea

[21] Appl. No.: 214,680

[22] Filed: Jul. 1, 1988

[30] Foreign Application Priority Data

Jan. 27, 1988 [KR] Rep. of Korea ............. 647/1988[U]

[51] Int. Cl.⁴ ............................................... C09K 5/00
[52] U.S. Cl. ...................................... 252/75; 252/74; 252/78.3; 252/389.54; 252/389.31
[58] Field of Search ............... 252/78.3, 74, 75, 389.3, 252/389.31, 389.32, 389.54

[56] References Cited

U.S. PATENT DOCUMENTS

| | | | |
|---|---|---|---|
| 4,292,190 | 9/1981 | Davis et al. | 252/77 |
| 4,338,209 | 7/1982 | Manabe et al. | 252/77 |
| 4,466,896 | 8/1984 | Darden | 252/78.3 |
| 4,548,787 | 10/1985 | Wilson et al. | 252/78.3 |

Primary Examiner—Paul Lieberman
Assistant Examiner—Christine A. Skane
Attorney, Agent, or Firm—Darby & Darby

[57] ABSTRACT

An antifreeze composition for use in aluminum internal combustion engines is disclosed. It is comprised of from 0.05 percent to 0.5 percent silicate, from 0.07 percent to 0.35 percent nitrate, from 0.2 percent to 2.0 percent phosphate, from 0.5 percent to 4.0 percent benzoate, from 0.1 percent to 1.0 percent molybdate, from 0.02 percent to 0.3 percent vanadate, from 0.05 percent to 0.3 percent triazole, and from 100 ppm to 5000 ppm organosilane stabilizer for the silicate. Organic amines and borates are excluded in the compositions and the pH of the compositions is from about 7 to about 9.

1 Claim, No Drawings

ANTIFREEZE CORROSION INHIBITOR COMPOSITION FOR ALUMINUM ENGINES AND RADIATORS

BACKGROUND OF THE INVENTION

1. Field of the Invention

The present invention relates to a composition for use in the cooling systems of internal combustion engines. The composition is an ethylene glycol-based antifreeze composition which is designed to protect aluminum water pumps, aluminum engine heads, and aluminum radiators from corrosion.

2. Description of the Prior Art

Water is generally accepted heat exchange medium for the cooling systems of internal combustion engines. Ethylene glycol is widely used to lower the freezing point of water and to raise its boiling point to enable the coolant to be used over a wider range of temperatures. However, ethylene glycol and other such antifreezes tend to corrode the metals from which the internal combustion engines are made under the condition of elevated temperature and aeration. Therefore, it has been necessary to add corrosion inhibitor compositions to the antifreeze solutions to lessen the corrosive effect of the solutions. (P. Weissler, Automotive Cooling Journal 26, 34 (1983))

Numerous corrosion inhibitors have been prepared to date. Such inhibitors include both organic materials and inorganic materials. Illustrative of organic materials that have been used in anti-freeze compositions are: guanidine, citrates, coal tar derivatives, petroleum bases, thiocyanates, peptones, phenols, thioureas, tannin, morpholin, triethanolamine, tartrates, organic nitrites, mercaptans and nitro-compounds. Illustrative of the inorganic materials that have been used in anti-freeze compositions are: sulfates, sulfides, the alkaline metal chromates, nitrites, phosphates, molybdates, vanadates, tungstates, borates, and silicates.

The corrosion inhibitors formulated in anti-freeze compositions should adequately retard corrosion of metals such as cast aluminum, cast iron, steel, copper, solder, and brass used in cooling systems and engines. Some inhibitors inhibit the corrosion of some metals but are not particularly useful in inhibiting the corrosion of other metals. Antifreeze compositions should not also attack or swell rubber hoses that are part of the cooling systems. Besides electrochemical oxidation, air cavitation causes the corrosion of the metals. Several inhibitors of organic and inorganic materials should be formulated at the same time in the anti-freeze compositions to meet metal corrosion protection requirements. Since anti-freeze compositions containing two or more phases entail dispensing and handling problems, it would be most desirable if such inhibited anti-freeze compositions were single phase systems.

In recent years, automobile manufacturers have been using more and more aluminum as a lightweight material in the construction of the internal combustion engines. Alkaline metal borates known as good corrosion inhibitors for cast iron engines do not provide good protection for aluminum (Japanese Patent 49-5509). It is known that alkaline metal silicates are effective corrosion inhibitors for aluminum alloys. It has therefore been desirable to use alkaline metal silicates in anti-freeze formulations. However, alkaline metal silicates tend to form gels in alkylene glycoles which are normally used as anti-freezes. M. C. Abel reported that gelation problem could be solved reducing the silicate amount under 0.08% and maintaining the pH of the composition between 9 and 11 (U.S. Pat. No. 4,426,309). Since aluminum is amphoteric, it will easily corrode in either strongly acidic or basic medium. Thus, it has been previously proposed to use a stabilizer to prevent the gelation of the alkali metal silicate in the antifreeze composition.

Several types of silicon compounds have been described as suitable stabilizers. For instance, U.S. Pat. Nos. 3,234,144 and 4,241,012 describe the use of aminosiloxanes as stabilizers; U.S. Pat. Nos. 3,3126,222 and 4,241,011 disclose carboxy siloxanes as suitable stabilizers; and U.S. Pat. Nos. 3,337,496 and 4,210,548 recommend the use of hydroxyalkyl derivatives of siloxanes. Resently hydroxyl and carboxy or cyano groups substituted organosilanes have been reported to be suitable as the stabilizers (U.S. patent application Ser. No. 180,489 filed Apr. 12, 1988)

DETAILED DESCRIPTION OF THE INVENTION

In the present invention, it has been found that the amount of silicate can be added as high as 0.5% of the anti-freeze composition accompanying with organosilane stabilizer. The other corrosion inhibitors such as triazoles, nitrates, benzoates, banadates, molybdates, and phosphates may be added to the compositions. However, organoamines which may product carcinogenic nitroso compounds in the presence of nitrites or nitrates are excluded. The pH of the compositions is adjusted to the relatively less basic range of 7-9.

Illustrative of the silicates in the present invention are the alkali metal ortho silicates and alkali metal meta silicates. Specific examples of the silicates are sodium ortho silicate, potassium ortho silicate, sodium meta silicate, and potassium meta silicate. The organosilane stabilizers are General formula 1

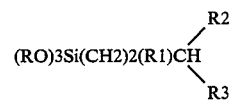

Wherein R is an alkyl group of 1–4 carbon atoms. R1 is either —CH2OCH2CH—CH2— or

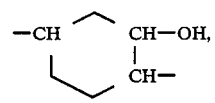

and R2 and R3 may be same or different and selected from Ph, CN,

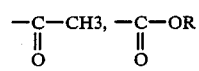

(wherein R is an alkyl group of 1–4 carbon atoms).

The present invention is further illustrated by the following examples and controls which are presented to illustrate but not limit the invention.

EXAMPLE 1

The anti-freeze solutions have been prepared as in the table 1.

TABLE 1

| | Antifreeze compositions | | |
|---|---|---|---|
| | Percent by weight (%) | | |
| Ingredients | Sample 1 | Sample 2 | Remarks |
| Ethylene glycols (mono & di). | 93.152 | 92.452 | |
| Demineralized water | 2.500 | 2.500 | |
| Sodium nitrate | 0.400 | 0.100 | |
| Sodium benzoate | 2.000 | 3.000 | bezoic acid included |
| Sodium triazole | 0.300 | 0.100 | |
| Sodium silicate | 0.200 | 0.400 | or potassium silicate |
| Sodium molybdate | 0.300 | 1.000 | |
| Organosilane | 0.020 | 0.020 | |
| Potassium Phosphate | 1.000 | 0.200 | |
| pigment | 0.008 | 0.008 | |
| Defoamer | 0.020 | 0.020 | |

Where organosilanes are the stabilizers for inorganic silicate corrosion inhibitors and have the structure represented by general formula 1.

EXAMPLE 2

The above compositions were tested according to ASTM method D-3306. The table 2 shows how the compositions of the present invention protected six metals and compares the performance for the above compositions to the standard. The numbers given are corrosion rates for an average of 10 coupons and are considered to be acceptable losses.

TABLE 2

| | Corrosion protection tests | | |
|---|---|---|---|
| | Corrosion Rate (milligrams lost per coupon) | | |
| | Invention Composition | | |
| Metals | Sample 1 | Sample 2 | ASTM D-3306 |
| Copper | −0.8 | −0.6 | −10 |
| Solder | −2.3 | −1.7 | −30 |
| Brass | −0.7 | −1.2 | −10 |
| Steel | −1.2 | −1.6 | −10 |
| Cast iron | −1.5 | +0.9 | −10 |
| Cast Aluminum | −1.8 | −0.8 | −30 |

We claim:

1. An antifreeze corrosion inhibitor composition for aluminium engines and radiators which utilize a polyhydroxyalcohol-based coolant, comprising adding to the coolant:
   (a) from about 0.07% to about 0.35% nitrate,
   (b) from about 0.05% to about 0.50% silicate,
   (c) from about 0.20% to about 2.00% phosphate,
   (d) from about 0.10% to about 1.00% molybdate,
   (e) from about 0.02% to about 0.30% vanadate,
   (f) from about 0.05% to about 0.30% of a compound selected from the group consisting of tolyltriazole, benzotriazole, and mixture thereof,
   (g) from about 0.50% to about 4.00% of a mixture of benzoic acid and benzoate,
   (h) from about 0.01% to about 0.50% of organosilane stabilizer for the silicate having the formula

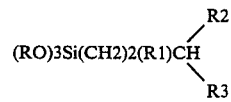

wherein R is an alkyl group of 1–4 carbon atoms, R1 is either

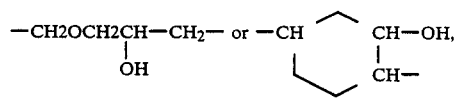

and R2 and R3 may be same or different and selected from Ph, CN,

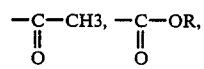

wherein R is an alkyl group of 1–4 carbon atoms, wherein the cations are selected from the group consisting of sodium, potassium, and mixtures thereof and wherein the pH of the composition is from about 7 to about 9.

* * * * *